(12) United States Patent
Bellamkonda et al.

(10) Patent No.: US 8,964,690 B2
(45) Date of Patent: Feb. 24, 2015

(54) METHOD AND APPARATUS FOR OPTIMIZING NETWORK ENTRY DURING HANDOFFS IN A WIRELESS COMMUNICATION SYSTEM

(75) Inventors: Krishna K. Bellamkonda, Arlington Heights, IL (US); Raghunath Hariharan, Streamwood, IL (US); Lalit K. Mamtani, Hoffman Estates, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 774 days.

(21) Appl. No.: 12/246,628

(22) Filed: Oct. 7, 2008

(65) Prior Publication Data

US 2010/0085936 A1 Apr. 8, 2010

(51) Int. Cl.
*H04W 36/00* (2009.01)
(52) U.S. Cl.
CPC .................................. *H04W 36/0077* (2013.01)
USPC .......................................... 370/331; 455/436
(58) Field of Classification Search
USPC ............................ 370/328, 331; 455/436, 437
See application file for complete search history.

(56) References Cited

U.S. PATENT DOCUMENTS

| 2005/0117539 | A1* | 6/2005 | Song et al. ..................... 370/328 |
| 2007/0218908 | A1 | 9/2007 | Kang et al. |
| 2007/0238464 | A1* | 10/2007 | Lim et al. ...................... 455/436 |
| 2008/0146235 | A1 | 6/2008 | Kang et al. |
| 2008/0161000 | A1* | 7/2008 | Li et al. ......................... 455/436 |

FOREIGN PATENT DOCUMENTS

| CN | 1870818 A | 11/2006 |
| WO | 2006104353 A2 | 10/2006 |
| WO | 2007081183 A1 | 7/2007 |

OTHER PUBLICATIONS

European Patent Office "Extend European Search Report" for Patent Application No. 0981964.05 dated Oct. 29, 2013, 9 pages.
"Handover using Exclusive HO Ranging Channel; C80216m-08 714", IEEE Draft; C80216M-08 714, IEEE-SA, Piscataway, NJ USA, vol. 802.16m, Jul. 7, 2008, pp. 1-7, XP017616566, [retrieved on Jul. 8, 2008].
"Dedicated code based HO ranging for 802.16m; C80216m-08 797", IEEE Draft; C80216M-08 797, IEEE-SA, Piscataway, NJ USA, vol. 802.16m, Jul. 7, 2008, pp. 1-6, XP017610732, [retrieved on Jul. 8, 2008].

(Continued)

*Primary Examiner* — Yemane Mesfin
*Assistant Examiner* — Henry Baron
(74) *Attorney, Agent, or Firm* — Paegre Baker Daniels LLP

(57) ABSTRACT

A method and apparatus for optimizing network entry during handoffs in a wireless communication network (100) includes receiving (302) target ranging codes from a serving network node (220), wherein each of the target ranging codes identifies one of a plurality of target network nodes. A handoff request is transmitted (304) to the serving network node (220), wherein the handoff request indicates a target ranging code (230) identifying at least one of the plurality of target network nodes. In reply to the handoff request, a handoff request response is received (310) from the serving network node that includes a unique handoff ranging code, wherein the unique handoff ranging code is different from the target ranging code. After receiving the handoff request response, ranging is initiated using the unique handoff ranging code (316) with the identified target network node (230).

18 Claims, 6 Drawing Sheets

(56) References Cited

OTHER PUBLICATIONS

The State Intellectual Porperty Office of the People's Republic of China, Notification of the First Office Action, Apr. 2, 2013, all pages.

Yeon, Choi Su: "The International Search Report and the Written Opinion of the International Searching Authority", Korean Intellectual Property Office, Daejeon, Republic of Korea, completed: Apr. 28, 2010, mailed: Apr. 29, 2010, all pages.

* cited by examiner

METHOD AND APPARATUS FOR OPTIMIZING NETWORK ENTRY DURING HANDOFFS IN A WIRELESS COMMUNICATION SYSTEM

FIELD OF THE DISCLOSURE

The present disclosure relates generally to a wireless communication network and more specifically to a method and apparatus for optimizing network entry during handoffs in the wireless communication network.

BACKGROUND

Wireless communication networks are widely deployed to provide various communication services such as voice, packet data, multi-media broadcast, and text messaging. These wireless communication networks may be multiple-access systems capable of supporting communication for multiple users by sharing the available network resources. Examples of such multiple-access systems include Code Division Multiple Access (CDMA) systems, Time Division Multiple Access (TDMA) systems, Frequency Division Multiple Access (FDMA) systems, and Orthogonal Frequency Division Multiple Access (OFDMA) systems. A CDMA system may implement Wideband CDMA (W-CDMA) or cdma2000. W-CDMA is described in documents from 3rd Generation Partnership Project (3GPP). CDMA2000 is described in documents from a consortium named "3rd Generation Partnership Project 2" (3GPP2). 3GPP and 3GPP2 documents are publicly available. WiMAX (Worldwide Interoperability for Microwave Access)-based systems are being designed and developed for operation in licensed bands, such as 2.3 GHz, 2.5 GHz, 3.3 GHz, 3.5 GHz etc.

A remote unit can move across a wireless communication network accessing different network nodes. To access each network node, the remote unit has to communicate with the respective network node using a ranging procedure. Existing ranging procedures include Fast Ranging or Handoff Ranging. When a handoff of a remote unit is desired, the remote unit may send a request message to a current serving network node. The request message notifies the current serving network node to initiate a handoff procedure. The serving network node, in response to the request message, may notify a target network node about the remote unit's attempt to handoff to the target network node. This notification to the target network node, via the backbone network, prepares the target network node for the handoff of the remote unit. The target network node may then allow non-contention-based Initial Ranging opportunities and a dedicated bandwidth allocation for the remote unit to support handoff ranging.

However, handoff ranging has high latency due to the fact that the remote unit has to initiate bandwidth request to the serving network node and then proceed in a similar manner to initial network entry. In addition, handoff ranging does not provide a unique footprint for the remote unit. This opens up more vulnerability in an extreme case where ranging codes are compromised by a hacker who intends a denial of service on the ranging region.

Fast ranging on the other hand increases resource utilization due to pre-allocated time frames for the remote unit. Most remote units in handoffs may not complete the handoff within the allocated time frames. For example, FIG. 1 illustrates a basic operation of a co-ordinated handoff. Under the basic operation of FIG. 1, a remote unit works through one of 3 Fast Ranging Opportunities that have a handoff latency of 45 ms, 60 ms, or 75 ms depending on the Fast Ranging Information Element (IE) that the remote unit used for the handoff. If any of these opportunities are missed then the remote unit has to perform Handoff Ranging contending for one of many shared Handoff Ranging Codes. FIG. 1 illustrates both the Fast Ranging as well as the Handoff Ranging latency. The following is a detailed description of the signaling flow of FIG. 1, with reference to the individual signaling instances labeled in FIG. 1:

Frame 2 (at remote unit): The remote unit transmits a handoff request (MSHO REQ) to a serving network node.

Frame 3 (at serving network node): The serving network node, in response to the MSHO REQ, transmits a prenotification request (Prenot REQ) to a target network node. The Prenot REQ notifies the target network node about remote unit's attempt to conduct the handoff with the target network node.

Frame 15 (at target network node): The target network node, in response to the Prenot—REQ, transmits a Prenot response (Prenot RSP) to the serving network node.

Frame 15 (at serving network node): The serving network node, in response to the Prenot-RSP, transmits a Handoff advise (HO ADVISE) to the target network node. The HO ADVISE indicates the target network node that remote unit has left for the target network node.

Frame 16 (at target network node): The target network node initiates a Fast Ranging Timer at the beginning of Frame 16. The Fast Ranging Timer takes into account the overheads involved in handover messaging at the serving network node. The Fast Ranging Timer continues until the remote unit leaves the coverage zone of the current serving network node and enters the coverage zone of the target network node.

Frame 16 (at serving network node): The serving network node transmits a handoff response (BSHO RSP) to the remote unit, which is received on frame 17 at the remote unit.

Frame 18 (at remote unit): The remote unit receives an allocation for handoff indication (Alloc for HO IND)

Frame 18 (at remote unit): The remote unit, in response to the allocation for the HO IND, transmits a handoff indication (HO IND) to the serving network node.

Frame 19 (at serving network node): The serving network node, after receiving the HO IND from the remote unit, transmits a handoff confirm (HO Confirm) to the target network node, which is received on frame 20 at the target network node.

Frame 23 (at target network node): The target network node stops the Fast Ranging Timer at the beginning of the Frame 23. The target network node then transmits an allocation for a first fast ranging to the remote unit. At this moment, the remote unit has left the coverage area of the serving network node and enters the coverage area of the target network node.

Frame 24 (at remote unit): The remote unit may either respond to the first fast ranging allocation by sending a ranging request (RNG REQ), as shown with dotted line, or may miss the opportunity to respond to the first fast ranging allocation. If the remote unit responds to the fast ranging allocations, the RNG REQ is then received by the target network node at Frame 25.

The remote unit may miss the opportunity to respond to a fast ranging allocation when the remote unit does not reach the target network node in the time specified for handoff by the target network node during the exchange of messages with the serving network node. The reasons for the remote unit to not reply to the fast ranging allocations may include cell topology, slow handoffs where the remote unit is unable to synchronize with the target network node due to obstructions, or change in RF conditions. Examples for such kind of obstructions may include buildings, slow moving traffic, or weather conditions during the handoff. In this case, the timing between the target network node and the remote unit is not synchronized and the target network node may waste the network resources to send fast ranging allocations to the remote unit.

Frame 26 (at target network node): After receiving the RNG REQ, the target network node transmits a ranging response (RNG RSP) to the remote unit.

If the remote unit is not able to utilize the opportunity of the first fast ranging allocation, the target network node may then transmit more fast ranging allocations to the remote unit. The number of fast ranging allocations sent to the remote unit may depend on the available network resources with the target network node. As shown in FIG. 1 the target network node transmits three fast ranging allocations to the remote unit in order for the remote unit to start fast ranging with the target network node and complete the handoff. The handoff latency from the transmission of the first fast ranging allocation to the third fast ranging allocation may increase from 45 ms to 75 ms.

Frame 32 (at remote unit): If the remote unit misses the third fast ranging allocation also, the remote unit then transmits a handoff ranging (HO RNG) code to the target network node, which is received by the target network node at Frame 33. In this case, the remote unit now has to perform Handoff Ranging to complete the handoff with the target network node. The remote unit selects the handoff ranging code from a plurality of handoff ranging codes that are broadcasted continuously by the serving network node. The selection of the handoff ranging code is based on the selection of a target network node as a potential candidate for handoff by the remote unit. This selection may be performed by the internal circuitry of the remote unit or the remote unit may obtain the information regarding the best candidate for handoff from the serving network node. The remote unit may then utilize the handoff ranging code of that target network node. The handoff ranging codes are broadcasted by the serving network node to all the remote units that communicating with the serving network node. Each handoff ranging code identifies one target network node as a potential candidate for handoff. These codes are Code Division Multiple Access (CDMA) codes that are assigned by every network node to facilitate handoffs.

Frame 34 (at target network node): After the target network node receives the handoff ranging code, the target network node provides timing and power adjustments that are required between the target network node and the remote unit. The target network node transmits the timing and power adjustments as a ranging response (RNG RSP) continue message to the remote unit.

Frame 35 (at remote unit): Following the corrections received as timing and power adjustments, the remote unit transmits the HO RNG code again to the target network node.

Frame 37 (at target network node): The target network node, after receiving the HO RNG code, transmits a RNG RSP success with an allocation for the remote unit to send a RNG REQ.

Frame 39 (at remote unit): The remote unit transmits a RNG REQ to the target network node, which is received by the target network node at Frame 40. The RNG REQ includes a Handoff ID and serving network node information that identifies the remote unit at the target network node.

Frame 41 (at target network node): The target network node transmits the RNG RSP to the remote unit, completing the handoff procedure. However, by this point in time the handoff latency has increase to 120 ms. Due to this high latency, in some cases, a subscriber may experience additional delay if timing and power adjustments are not made. Moreover, the subscriber has to contend for Ranging codes in order to complete the handoff.

Therefore, as alluded to above, Fast Ranging is not an optimized solution to complete the handoff and in most cases it wastes Over The Air Radio resources. Fast ranging provides unsolicited allocations for the remote unit. Since these unsolicited allocations or pre-set allocations utilize a substantial amount of bandwidth, the target network node stops these allocations after a predetermined number of allocations. Total Fast Ranging duration includes the Fast Ranging Timer during which the target network node waits for the remote unit to arrive under the target network node's coverage zone and the pre-set allocations for the remote unit.

Fast ranging may provide a latency of 45 ms, in contrast to a latency of 120 ms in the handoff ranging, however Fast Ranging does not provide Timing and Power Corrections, something that is crucial in keeping a call active with changing RF conditions that typically happen in handoff scenarios. Handoff Ranging on the other hand has a higher latency, such as 120 ms in contrast to a latency of 45 ms in Fast Ranging, but covers for the Timing and Power Corrections which is better in sustaining the link during the handover. If the remote unit does not initiate fast ranging within the allocated time frame, the remote unit then has to perform Handoff Ranging.

Accordingly, there is a need for an improved and more efficient method and apparatus for optimizing network entry during handoffs in a wireless communication network.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
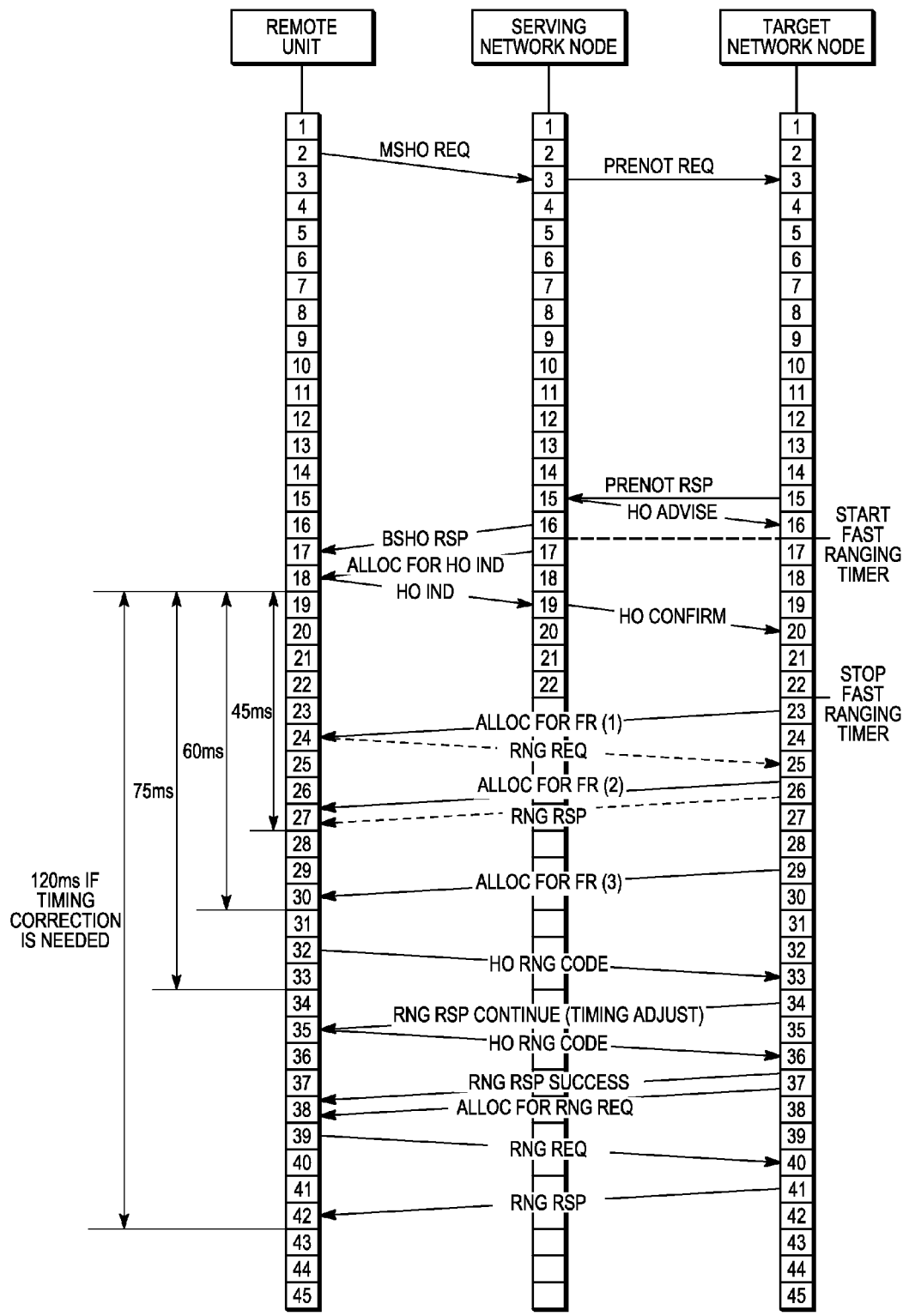
FIG. 1 is a signaling flow diagram that illustrates a method for supporting handoffs in a wireless communication network in accordance with prior art.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Pursuant to the various embodiments, a method for optimizing network entry during handoffs in a wireless communication network by at least one of a plurality of remote units includes receiving target ranging codes from a serving network node, wherein each of the target ranging codes identifies one of a plurality of target network nodes, and transmitting a handoff request to the serving network node, wherein the handoff request indicates a target ranging code identifying at least one of the plurality of target network nodes. The method further includes receiving a handoff request response including a unique handoff ranging code from the serving network node in response to the handoff request, wherein the unique handoff ranging code is different from the target ranging code, and initiating ranging using the unique handoff ranging code with the identified target network node.

In another embodiment, the method by a serving network node includes broadcasting target ranging codes to a plurality of remote units associated with the serving network node, wherein each of the target ranging codes identifies one of a plurality of target network nodes, and receiving a handoff request from at least one of the plurality of remote units, wherein the handoff request indicates a target ranging code of the broadcasted target ranging codes identifying at least one of the plurality of target network nodes as a handoff candidate for the at least one of the plurality of remote units. The method further includes transmitting a handoff request response to at least one of the plurality of remote units, wherein the handoff request response includes a unique handoff ranging code, wherein the unique handoff ranging code is different from the target ranging code.

Figure 2:
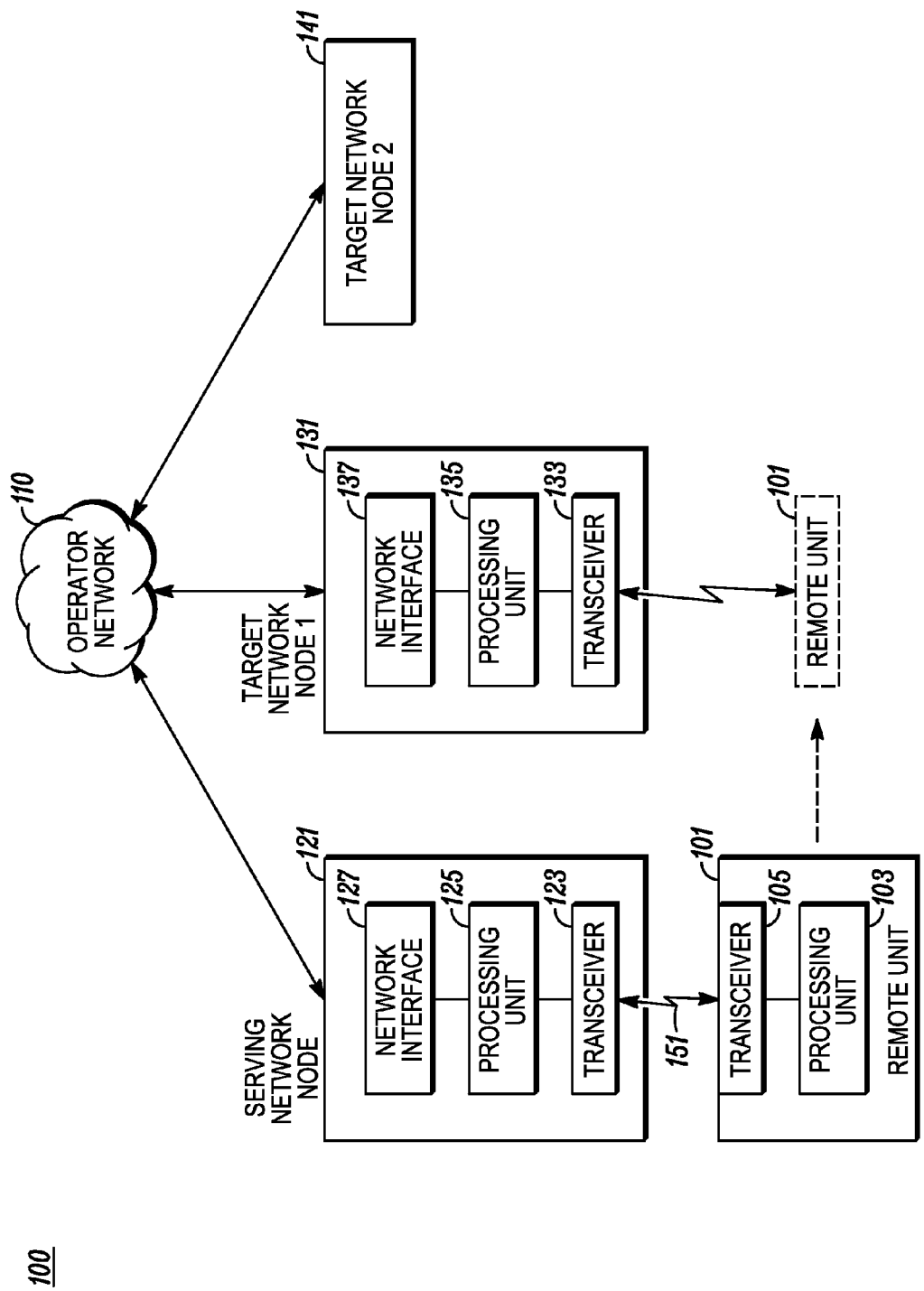
FIG. 2 is a system diagram illustrating a wireless communication network in accordance with some embodiments.

Referring now to the figures, FIG. 2 is a system diagram illustrating a wireless communication network 100 in accordance with some embodiments. At present, standards bodies such as OMA (Open Mobile Alliance), 3GPP (3rd Generation Partnership Project), 3GPP2 (3rd Generation Partnership Project 2), IEEE 802 (Institute of Electrical and Electronics Engineers), and Worldwide Interoperability for Microwave Access (WiMAX) Forum are developing standards specifications for wireless telecommunications systems. Communication network 100 represents a network having an architecture in accordance with one or more of the WiMAX technologies, suitably modified to implement the present invention. Alternative embodiments of the present invention may be implemented in communication networks that employ other or additional technologies such as, but not limited to, those described in the OMA, 3GPP2, IEEE 802, and/or 3GPP2 specifications. The wireless communication network 100 comprises at least one of an Orthogonal Frequency Division Multiple Access (OFDMA) network or an Orthogonal Frequency Division Multiplexing (OFDM) network.

Communication network 100 is depicted in a generalized manner. For example, network 100 is shown to include remote unit 101, a serving network node 121, a target network node 131, a target network node 141, and an operator network 110. The serving network node 121 is shown providing network services to remote unit 101 using wireless interface 151. Wireless interface 151 is in accordance with the particular access technology supported by the network node 121. For example, it may utilize the same technology such as one based on IEEE 802.16 or different access technologies. It should be understood that the target network node 131 and the target network node 141 may also provide access to the remote unit 101 using a wireless interface.

The remote unit 101 includes the capability to communicate with the serving network node 121 or target network node 131, 141 through one or more wireless communication protocols such as Advanced Mobile Phone System (AMPS), Code division multiple access (CDMA), Time division multiple access (TDMA), Global System for Mobile communications (GSM), Integrated Digital Enhanced Network (iDEN), General Packet Radio Service (GPRS), Enhanced Data rates for GSM Evolution (EDGE), Universal Mobile Telecommunications System (UMTS), Wideband Code Division Multiple Access (WCDMA), Code division multiple access 2000 (CDMA2000), and their variants. The remote unit 101 may also use ad-hoc communication to connect directly to another remote unit in the communication network 100 and to execute applications that may utilize the ad-hoc connection. It should be understood that FIG. 2 only depicts one remote unit; however there may be more remote units that may communicate with an operator network via a network node.

Further, it should be understood that the present invention is not limited to mobile remote units. Other types of wireless access terminals which may include fixed wireless terminals may be used. It should be understood that the term "remote unit" in the claims and description below includes both mobile wireless communication devices (e.g., mobile phones, wireless handheld computers), stationary wireless terminals (e.g., fixed wireless router) or other electronic battery operated devices coupled to a network.

Those skilled in the art will recognize that FIG. 2 does not depict all of the physical fixed network components that may be necessary for network 100 to operate but only those network components and logical entities particularly relevant to the description of embodiments herein. For example, FIG. 2 depicts serving network node 121 comprising processing unit 125, transceiver 123, and network interface 127. The remote unit 101 comprises a transceiver 105 and a processing unit 105. For a better understanding, the remote unit 101 is more fully described hereafter. FIG. 1 also depicts target network node 131 comprising a transceiver 133, a processing unit 135, and a network interface 137. Further, it should be understood that the target network node 141 may also comprise similar components as depicted for target network node 131.

Remote unit 101, serving network node 121, and the target network node 131 are shown communicating via technology-dependent, wireless interfaces. Remote units, subscriber stations (SSs) or user equipment (UEs), may be thought of as mobile stations (MSs), mobile subscriber stations (MSSs) or mobile nodes (MNs). In addition, remote unit platforms are known to refer to a wide variety of consumer electronic platforms such as, but not limited to, mobile stations (MSs), access terminals (ATs), terminal equipment, mobile devices, gaming devices, personal computers, and personal digital assistants (PDAs). Further, depending on the embodiment, the remote unit 101 may additionally comprise a keypad (not shown), a speaker (not shown), a microphone (not shown), and/or a display (not shown). Processing units, transceivers, keypads, speakers, microphones, and displays as used in remote units and/or network nodes and/or content sources are all well-known in the art.

For example, processing units are known to comprise basic components such as, but neither limited to nor necessarily requiring, microprocessors, microcontrollers, memory devices, application-specific integrated circuits (ASICs), or logic circuitry. Such components are typically adapted to implement algorithms or protocols that have been expressed using high-level design languages or descriptions, expressed using computer instructions, expressed using signaling flow diagrams, or expressed using logic flow diagrams.

Thus, given a high-level description, an algorithm, a logic flow, a signaling flow, or a protocol specification, those skilled in the art are aware of the many design and development techniques available to implement a processing unit that performs the given logic. Therefore, remote unit 101, serving network node 121, and target network node 131 represent known devices that have been adapted, in accordance with the description herein, to implement multiple embodiments of the present invention. Furthermore, those skilled in the art will recognize that aspects of the present invention may be implemented in and across various physical components and none are necessarily limited to single platform implementations. For example, a network node may be implemented in or across one or more RAN components, such as a base transceiver station (BTS) or a base station controller (BSC), a Node-B or a radio network controller (RNC), or an HRPD AN or PCF, or implemented in or across one or more access network (AN) components, such as an access service network (ASN) gateway or ASN base station (BS), an access point (AP), a wideband base station (WBS), or a WLAN (wireless local area network) station.

Operation of embodiments in accordance with the present invention occurs substantially as follows, first with reference to FIG. 2. The processing unit 103, via the transceiver 105, of the remote unit 101 detects a communication loss with the serving network node 121. Such a communication loss can have various causes, chief among these would simply be rapidly deteriorating air interface conditions. Anticipating that the remote unit 101 unit may initiate a handoff with another network node, the serving network node 121 proceeds to support or facilitate the handoff in an attempt to reduce the handoff delays that remote unit 101 will incur. Depending upon various embodiments, the remote unit 101, the serving network node 121, and the target network node 131 may take various actions.

In one embodiment, the remote unit 101 utilizes target ranging codes to identify at least one potential target network node for a handoff. These target ranging codes are broadcasted by the serving network node 121 to all the remote units that are communicating with the serving network node 121. In one example, the remote unit 101 identifies the target network node 131 as a potential candidate for a handoff. The remote unit 101 in this case sends to the serving network node 121 a request message for handoff with the target network node 131. The serving network node 121 will then communicate for remote unit's 101 handoff with the target network node 131 by exchanging messages with the remote unit 101 ad the target network node 131. A response for the handoff request is then sent to the remote unit 101 by the serving network node 121. The response sent to the remote unit 101 includes a unique handoff ranging code. The unique handoff ranging code is obtained by the serving network node 121 during the exchange of messages between the serving network node 121, the remote unit 101, and the target network node 131. After receiving the unique handoff ranging code from the serving network node 121, the remote unit 101 initiates ranging using the unique handoff ranging code.

The use of the unique handoff ranging code enables efficient utilization of bandwidth. In this case, during ranging, a target network node on identifying a remote unit based on the unique handoff ranging code, directly issues a handoff ranging response without the requirement of a handoff ranging request from the remote unit. In one example, power/timing adjustments for the remote unit may also be sent to the remote unit along with the unique handoff ranging code. Sending of these adjustments will enable the remote unit to conduct handoff under varied signal conditions.

In one embodiment, the processing unit 103 is coupled to the transceiver 105, and is adapted to receive target ranging codes from a serving network node, wherein each of the target ranging codes identifies one of a plurality of target network nodes. The processing unit 103 is further adapted to transmit a handoff request to the serving network node, wherein the handoff request indicates a target ranging code identifying at least one of the plurality of target network nodes and receive a handoff request response including a unique handoff ranging code from the serving network node in response to the handoff request, wherein the unique handoff ranging code is different from the target ranging code. The processing unit 103 further initiates ranging using the unique handoff ranging code with the identified target network node.

In another embodiment, the processing units 125, 135 are coupled to the transceivers 123, 133, respectively, and are adapted to broadcast target ranging codes to a plurality of remote units associated with the serving network node, wherein each of the target ranging codes identifies one of a plurality of target network nodes. The processing unit 125 is further adapted to receive a handoff request from at least one of the plurality of remote units, wherein the handoff request indicates a target ranging code of the broadcasted target ranging codes identifying at least one of the plurality of target network nodes as a handoff candidate for the at least one of the plurality of remote units. The processing unit 125 further transmits a handoff request response to at least one of the plurality of remote units, wherein the handoff request response includes a unique handoff ranging code and wherein the unique handoff ranging code is different from the target ranging code.

Figure 3:
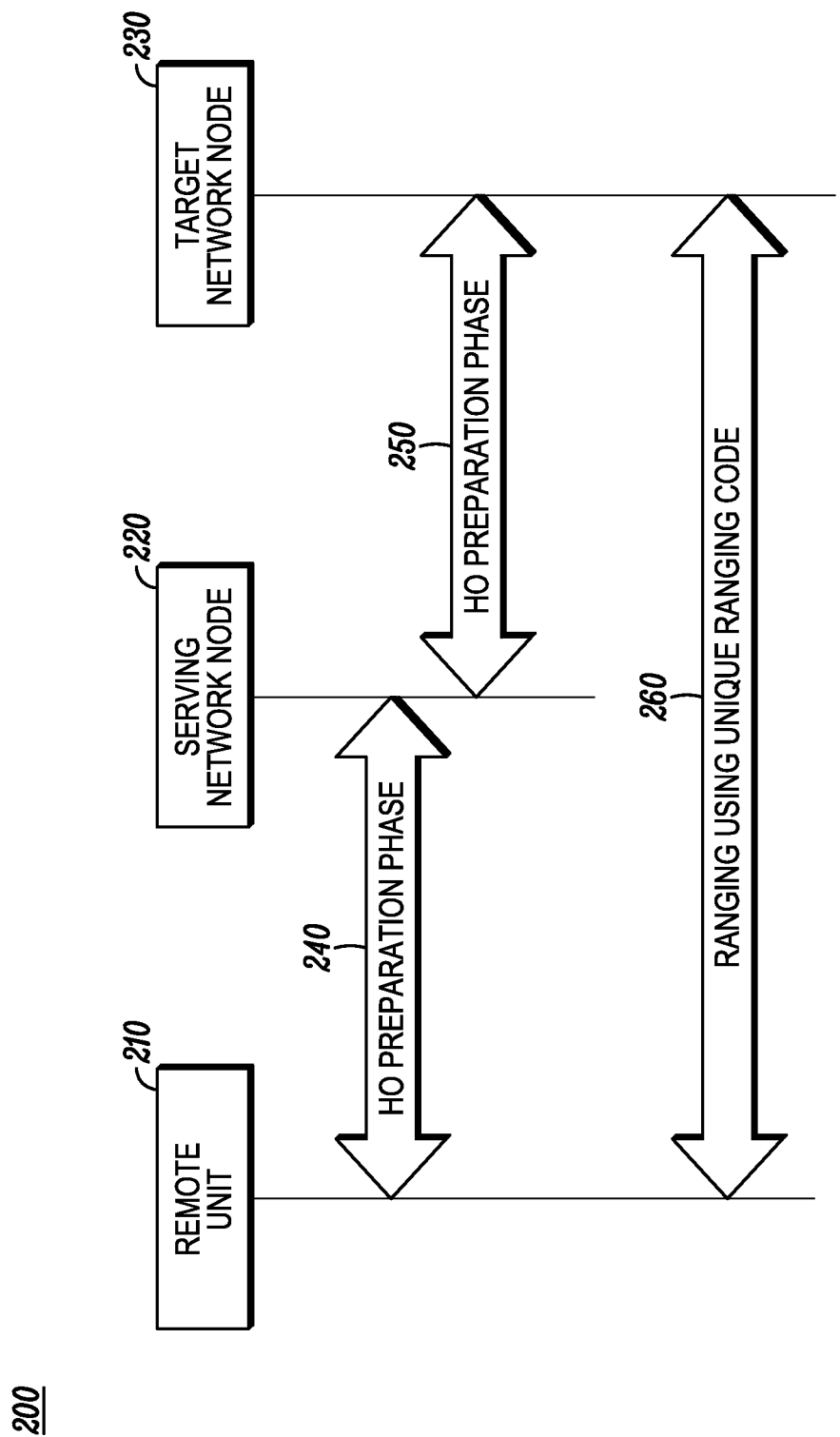
FIG. 3 is a signaling flow diagram illustrating an operation of the wireless communication network of FIG. 2, in accordance with some embodiments.

FIG. 3 is a signaling flow diagram illustrating a general operation 200 of the wireless communication network 100 of FIG. 2, in accordance with some embodiments. The operation 200 illustrates a handoff (HO) preparation phase 240 between the remote unit 210 and the serving network node 220. The operation 200 also illustrates a HO preparation phase 250 between the serving network node 220 and the target network node 230. During the HO preparation phase 240, 250 the remote unit 210 prepares for the HO with the target network node 230. The remote unit 210 begins with requesting for handoff by sending a request message to the serving network node 220. The serving network node 220 communicates this request to the target network node 230, and in response receives a unique HO ranging code. The target network node 230 sends the unique HO ranging code to the serving network node 220, which then sends the unique HO ranging code to the remote unit 210. The remote unit 210 using this unique code initiates ranging 260 with the target network node 230 to complete the HO.

Figure 4:
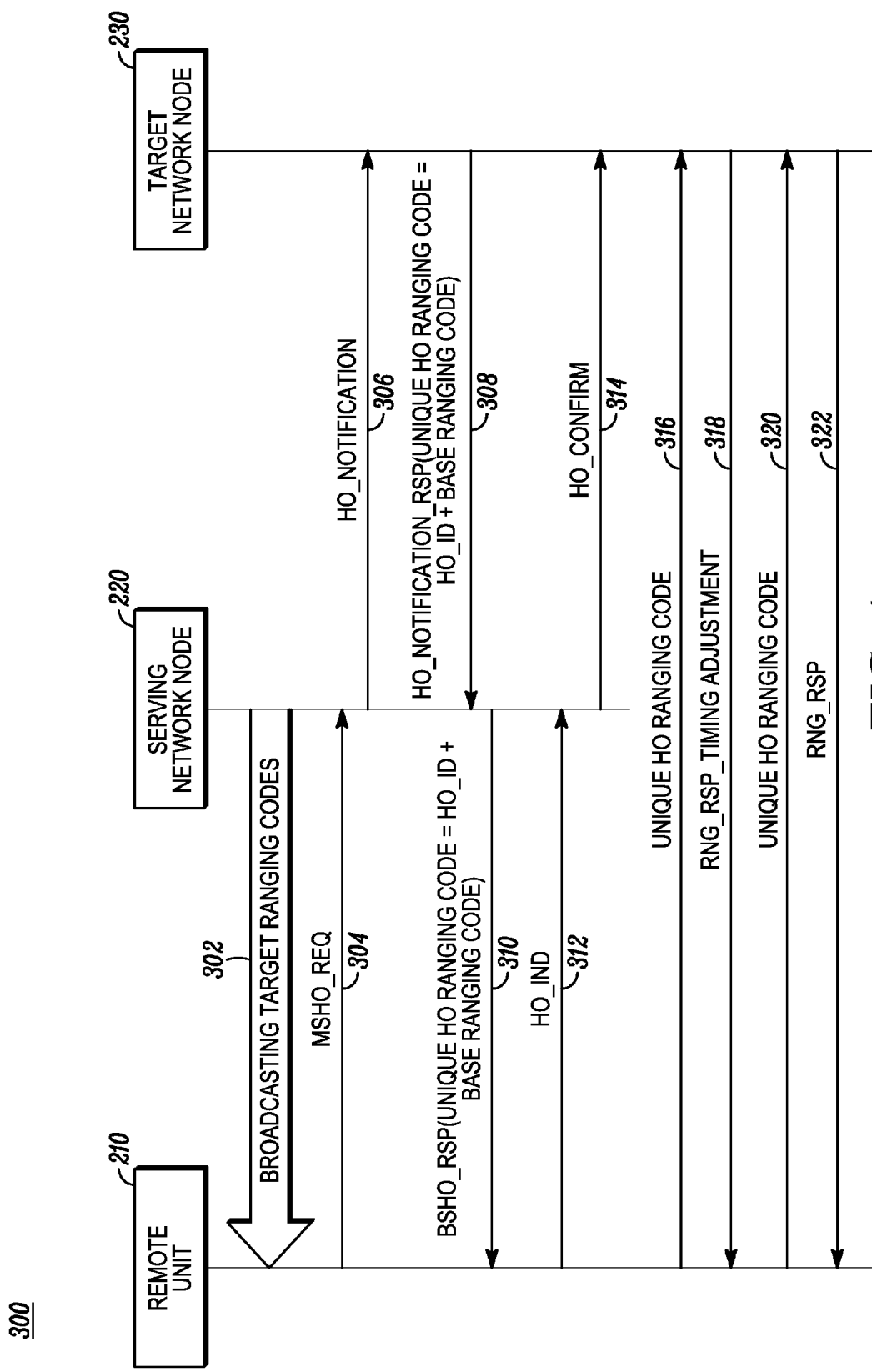
FIG. 4 is a signaling flow diagram illustrating an operation of the wireless communication network of FIG. 2, in accordance with some embodiments.

FIG. 4 is a signaling flow diagram illustrating a detailed operation 300 of the wireless communication network 100 of FIG. 2, in accordance with some embodiments. The serving network node 220 broadcasts 302 target ranging codes to a plurality of remote units that are associated with the serving network node 220. These target ranging codes are obtained by the serving network node 220 from the target network node 230 and known by the serving network node prior to the remote node requesting handoff as described here. Each of the target ranging codes identifies one target network node as a potential handoff candidate. The remote unit 210 may pick one of a plurality of target network nodes based on the target ranging codes broadcasted by the serving base station 220.

The remote unit 210 then transmits 304 a handoff request message (MSHO_REQ) to the serving network node 220. The handoff request message includes the target ranging code of one of the plurality of target network nodes that has been identified as a potential candidate for handoff by the remote unit 210. It should be understood that the remote unit 210 may also send more than one target ranging code identifying more than one potential target network node as a handoff candidate.

The serving network node 220 after receiving the MSHO_REQ transmits 306 a handoff notification (HO_NOTIFICATION) to a target network node identified as the potential handoff candidate by the remote unit 210. In the embodiment illustrated, the serving network node 220 transmits the HO_NOTIFICATION to the target network node 230; however it should be understood that the HO_NOTIFICATION may also be sent to more than one target network node based on the number of target ranging codes received by the serving network node 220 in the MSHO_REQ. The target network node 230, in response to the HO_NOTIFICATION sent by the serving network node 220, transmits 308 a handoff notification response (HO_NOTIFICATION_RSP) to the serving network node 220. This HO_NOTIFICATION_RSP comprises a unique handoff ranging code. The unique handoff ranging code is different from the target ranging code that identifies the target network node 230. The unique ranging code uniquely identifies the remote unit 210. The unique ranging codes are used by a target network node to identify the remote unit during a ranging procedure. In one example the unique handoff ranging code is a Code Division Multiple Access (CDMA) based code.

In another example, a pseudo-random code is generated which in turn generates a unique CDMA code index. This unique CDMA code index is the unique handoff ranging code as described in the various embodiments of the present invention. The pseudo-random code is generated by the target network node during a handover preparation phase and is communicated to a remote unit during the exchange of messages for the handoff. The pseudo-random code is generated from a pool, whose size is limited by a system design parameter for maximum number of admissible remote units during handoff. The mapping of pseudo-random code to the CDMA code index is direct or may be via a hash table which maps the pseudo-random code to a relevant CDMA code index. In some embodiments, there may be a need to limit the pseudo-random code, if during hash table implementation the pseudo-random code becomes higher than the maximum permissible CDMA code index. The pseudo-random code guarantees the uniqueness per remote unit and indexes all remote units and their context information.

In another example, the unique handoff ranging code may be derived by combining a handover ID (HO_ID) and a base ranging code. In general operations, HO_IDs are unique identifiers that are used to identify the remote unit at the target network node after receiving an allocation to send the message containing the HO_ID. This allocation is provided to the remote unit when the remote unit sends a HO RNG CODE or a target ranging code identifying the target network node for handoff and thereafter waits for timing and power adjustments. After the adjustments are performed and the remote unit receives the allocation, the remote unit then transmits the HO_ID to let the target network node know of the remote unit's previous serving network node. However, in the present embodiment the HO_ID is combined with the base ranging code to generate the unique handoff ranging code. The base ranging code can be a CDMA based ranging code. The base ranging code identifies the specific target network node, however is not broadcasted with other target ranging codes that identify the specific target network node. This combination of HO_ID and the base ranging code generates a unique handoff ranging code that uniquely identifies the remote unit at the target network node. In this case, the remote unit does not have to wait to receive the allocation to send the HO_ID+the base ranging code. This reduces the overall usage of network resources such as bandwidth.

Referring back to the FIG. 4, the serving network node 220, in response to the HO_NOTIFICATION_RSP received from the target network node 230, transmits 310 a handoff request response (BSHO_RSP) message to the remote unit 210. The BSHO_RSP message comprises the unique handoff ranging code, which as is known is created using the HO_ID and the base ranging code. The remote unit 210 after receiving the MSHO_RSP from the serving network node 220 transmits 312 a handoff indication (HO_IND) message to the serving network node 220. The HO_IND message indicates remote unit's 210's confirmation to perform the handoff with the target network node 230. The serving network node 220 after receiving the HO_IND, transmits 314 a handoff confirm message to the target network node 230 confirming the handoff of the remote unit 210 from the serving network node 220 to the target network node 230.

The remote unit 210 initiates ranging with the target network node 230 using the unique handoff ranging code. The remote unit 210 transmits 316 the unique handoff ranging code to the target network node 230. The target network node 230 in response to the reception of the unique handoff ranging code, transmits 318 a ranging response with timing adjustments (RNG_RSP_TIMING ADJUSTMENT) to the remote unit 210. The RNG_RSP_TIMING ADJUSTMENT may also include power adjustments for the remote unit to set the signal power to an appropriate level. The remote unit 210 uses the timing and power adjustments to synchronize with the target network node 230. The remote unit 210 after receiving the timing adjustments in the ranging response transmits 320 the unique handoff ranging code to the target network node 230. The target network node 230, in response to the unique handoff ranging code, transmits 322 a ranging response (RNG_RSP) to the remote unit 210 to complete the ranging procedure. The remote unit 210 connects with the target network node 230 changing the target network node 230 to a serving network node 230 for the remote unit 210. The above mentioned procedure (302-322) is repeated when the remote unit 210 initiates a handoff from the newly acquired serving network node 230 to a new potential target network node.

Figure 5:
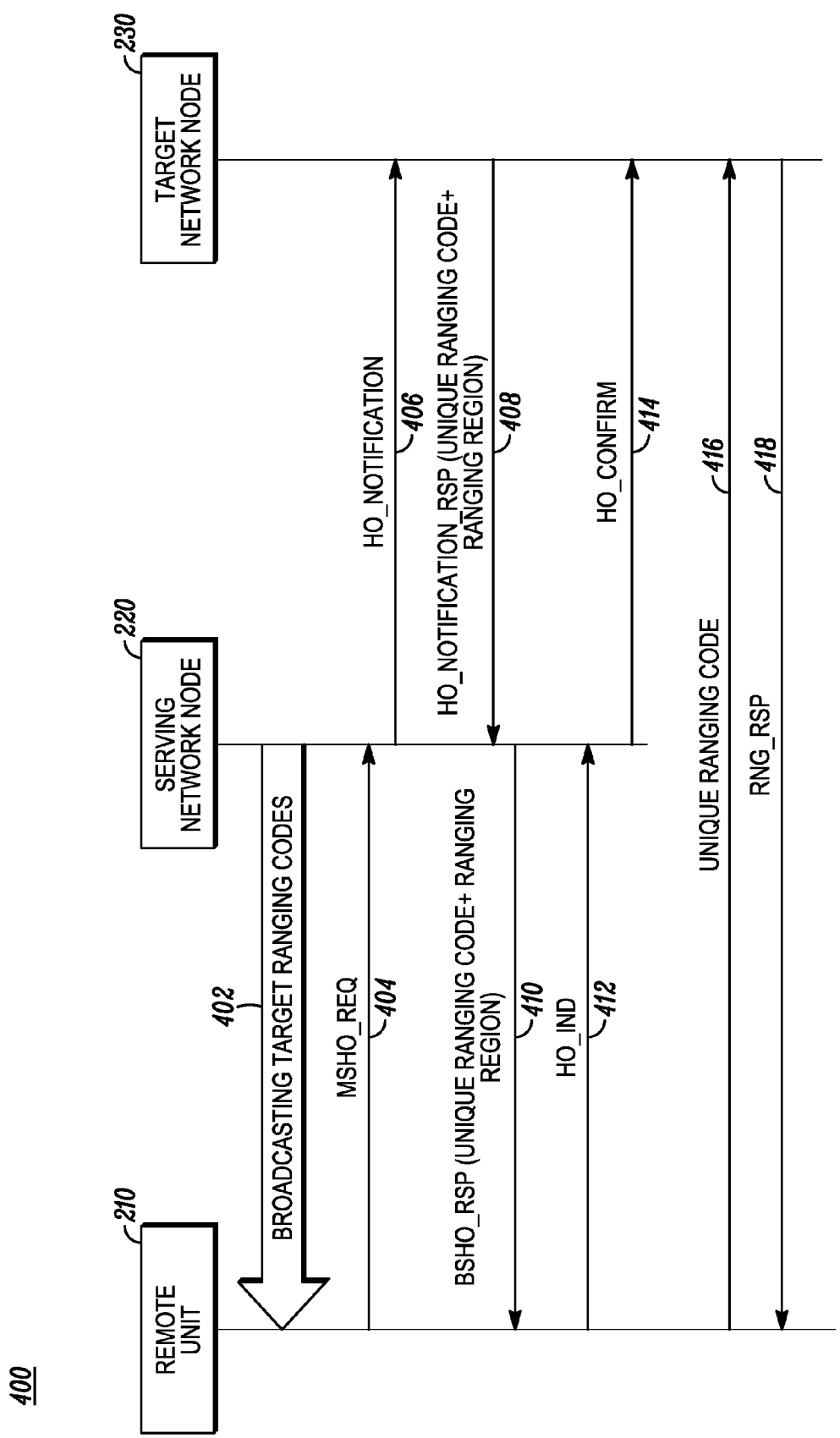
FIG. 5 is a signaling flow diagram illustrating an operation of the wireless communication network of FIG. 2, in accordance with some embodiments.

FIG. 5 a signaling flow diagram illustrating a detailed operation 400 of the wireless communication network 100 of FIG. 2, in accordance with some embodiments. The serving network node 220 broadcasts 402 target ranging nodes to a plurality of remote units that are associated with the serving network node 220. These target ranging codes are obtained by the serving network node 220 from the target network node 230. Each of the target ranging codes identifies one target network node as a potential handoff candidate. The remote unit 210 picks one of a plurality of target network nodes based on the target ranging codes broadcasted by the serving base station 220. The remote unit 210 then transmits 404 a handoff request message (MSHO_REQ) to the serving network node 220. This request includes the target ranging code of one of the plurality of target network nodes that has been identified as a potential candidate for handoff by the remote unit 210. It should be understood that the remote unit 210 may also send more than one target ranging code identifying more than one potential target network node as a handoff candidate.

The serving network node 220 after receiving the MSHO_REQ transmits 406 a handoff notification (HO_NO- TIFICATION) to a target network node that has been identified as a potential handoff candidate by the remote unit 210. In the embodiment illustrated, the serving network node 220 transmits 406 the HO_NOTIFICATION to the target network node 230, however it should be understood that the HO_NOTIFICATION may also be sent to more than one target network node based on the number of target ranging codes received by the serving network node 220 in the MSHO_REQ. The target network node 230, in response to the HO_NOTIFICATION sent by the serving network node 220, transmits 408 a handoff notification response (HO_NOTIFICATION_RSP) to the serving network node 220. This HO_NOTIFICATION_RSP comprises a unique handoff ranging code and a dedicated ranging region information. Using the dedicated ranging region information, the target network node 230 may provide precise timing, power, and frequency adjustments. The dedicated ranging region information also provides improved radio link reliability. In this case, the target network node 230 will have the information about where exactly the remote unit 210 will be ranging. The dedicated ranging region information specifies a specific timing region for the remote unit 210 to transmit in a specific ranging zone.

The serving network node 220, in response to the HO_NOTIFICATION_RSP received from the target network node 230, transmits 410 a handoff request response (BSHO_RSP) message to the remote unit 210. The BSHO_RSP message comprises the unique handoff ranging code and the dedicated ranging region information. After receiving the BSHO_RSP from the serving network node 220, the remote unit 210 transmits 412 a handoff indication (HO_IND) message to the serving network node 220. The HO_IND message indicates remote unit's 210's confirmation to perform the handoff with the target network node 230. The serving network node 220 after receiving the HO_IND, transmits 414 a handoff confirm message (HO_CONFIRM) to the target network node 230 confirming the handoff of the remote unit 210 from the serving network node 220 to the target network node 230.

The remote unit 210 initiates ranging with the target network node 230 using the unique handoff ranging code. The remote unit 210 transmits 416 the unique handoff ranging code to the target network node 230. The target network node 230, in response to the unique handoff ranging code, transmits 418 a ranging response (RNG_RSP) to the remote unit 210 to complete the ranging procedure. The remote unit 210 connects with the target network node 230 changing the target network node 230 to a serving network node 230 for the remote unit 210. The above mentioned procedure (402-418) is repeated when the remote unit 210 initiates a handoff from the serving network node 230 to a new potential target network node.

While FIGS. 4 and 5 more generally depict two different groups of embodiments of the present invention, it is believed that a more detailed description of particular embodiments of the present invention will assist the reader in understanding and implementing the more generically described embodiments above. The embodiments described below are provided as examples. They are provided as particular, and quite specific, example embodiments of the present invention. They are intended to further the reader's understanding of the variety of possible embodiments rather than to limit the scope of the invention.

Figure 6:
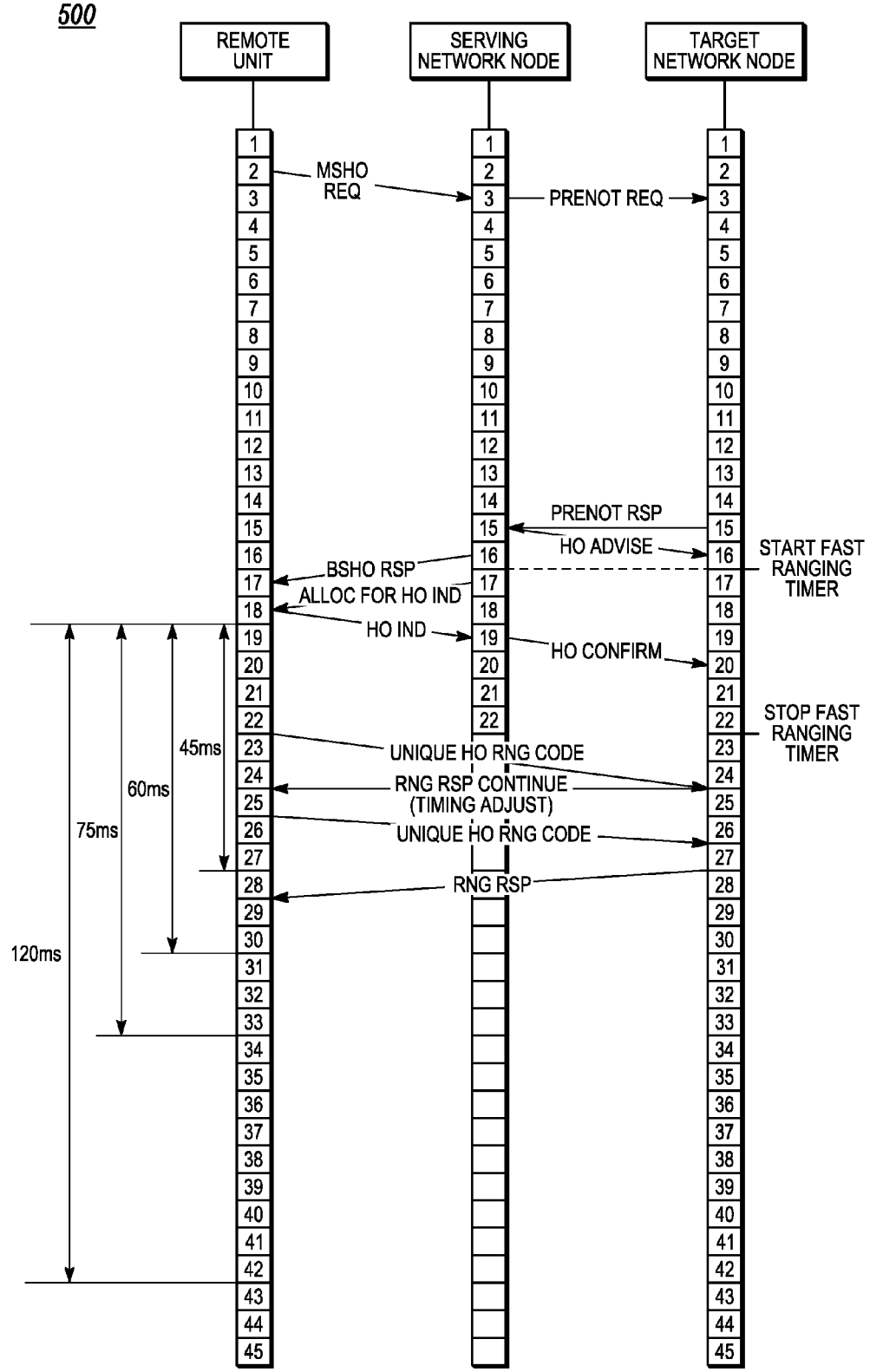
FIG. 6 is a signaling flow diagram illustrating an operation of the wireless communication network of FIG. 2, in accordance with some embodiments.

FIG. 6 a signaling flow diagram illustrating a more specific operation 500 of the wireless communication network 100 of FIG. 2, in accordance with some embodiments. The following is a detailed description of the signaling flow with reference to the individual signaling instances labeled in FIG. 6 and can be compared to FIG. 1 to see the differences of the described system to the prior art:

Frame 2 (at remote unit): The remote unit transmits a handoff request (MSHO REQ) to a serving network node.

Frame 3 (at serving network node): The serving network node, in response to the MSHO REQ, transmits a prenotification request (Prenot-REQ) to the target network node.

Frame 15 (at target network node): The target network node, in response to the Prenot-REQ, transmits a Prenot response (Prenot-RSP) to the serving network node.

Frame 15 (at serving network node): The serving network node, in response to the Prenot-RSP, transmits a Handoff advise (HO advise) to the target network node.

Frame 16 (at serving network node): The serving network node 220 transmits a handoff response (BSHO RSP) to the remote unit, which is received on Frame 17 at the remote unit. The BSHO RSP comprises a unique handoff ranging code that is unique for the remote unit and is assigned by the target network node during a handoff preparation phase.

Frame 17 (at target network node): The target network node starts a Fast Ranging Timer at the beginning of the Frame 17.

Frame 18 (at remote unit): The remote unit receives an allocation for handoff indication (Alloc for HO IND) and Frame 18 (at remote unit): The remote unit, in response to the Alloc for HO IND, transmits a handoff indication (HO IND) to the serving network node.

Frame 19 (at serving network node): The serving network node, after receiving the HO IND from the remote unit, transmits a handoff confirm (HO Confirm) to the target network node, which is received on Frame 20 at the target network node.

Frame 22 (at remote unit): The remote unit transmits the unique handoff ranging code to the target network node to identify itself at the target network node. By transmitting the unique handoff ranging code to the target network node, the remote unit does not have to transmit a ranging request (RNG REQ) to announce the remote unit's arrival on the target network node. The detection by the target network node of the unique handoff ranging code may be sufficient to identify the arrival of the remote unit at the target network node. In this case, the target network node may have the context of the remote unit already in place from a Handoff Preparation Phase. In one example, the Handoff preparation phase may include the exchange of messages to indicate the target network node about the remote unit's attempt to conduct a handoff to the target network node and to provide the remote unit with the unique handoff ranging by the target network node. Therefore, the target network node may initiate the handoff process by directly sending ranging response without waiting to receive the RNG REQ from the remote unit.

Frame 22 (at target network node): The target network node stops the fast ranging timer.

Frame 24 (at target network node): The target network node, in response to the unique handoff ranging code, transmits a ranging response (RNG RSP) including timing adjustments.

Frame 25 (at remote unit): The remote unit, in response to receiving the RNG RSP with timing adjustments in frame 24, transmits the unique handoff ranging code to the target network node.

Frame 27 (at target network node): The target network node, after receiving the unique handoff ranging code on frame 26, transmits a handover ranging response to the remote unit to complete the handoff. In this case, the handoff latency will be a little more than 45 ms (as shown in FIG. 6).

Therefore, as compared to the known arts (as shown in FIG. 1), where the handoff latency may range from 45 ms to 120 ms, the handoff latency may be reduced to as low as a little more than 45 ms. As shown in FIG. 6, the remote unit does not have to wait for an allocation for a fast ranging, and can directly send the unique handoff ranging code to the target network node. In this case, the remote unit can receive a RNG RSP from the target network node without the need of sending a RNG REQ to the target network node. This efficiently improves the use of the network resources such as bandwidth, etc. Moreover, as shown in FIG. 1, for the remote unit to receive the timing adjustments, the remote unit has to miss the fast ranging opportunities and perform a handoff ranging. This increases the handoff latency from 45 ms to 120 ms, and therefore more usage of network resources.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for optimizing network entry during handoffs in a wireless communication network comprising:
   receiving target ranging codes from a serving network node, wherein each of the target ranging codes identifies one of a plurality of target network nodes;
   transmitting a handoff request to the serving network node, wherein the handoff request indicates a target ranging code identifying at least one of the plurality of target network nodes;
   receiving a handoff request response including a unique handoff ranging code from the serving network node in response to the handoff request, wherein the unique handoff ranging code is different from the target ranging code, wherein the unique handoff ranging code is derived from a handover ID corresponding to the handoff request, and wherein the unique handoff ranging code uniquely identifies a remote unit;
   initiating ranging using the unique handoff ranging code with an identified target network node from the plurality of target network nodes.

2. The method of claim 1, wherein the handoff request response further includes timing adjustment for at least one of a plurality of remote units.

3. The method of claim 1 further comprising:
transmitting a handoff indication to the serving network node in response to the handoff request response.

4. The method of claim 1, wherein ranging further comprises:
transmitting the unique handoff ranging code to the identified target network node;
receiving a ranging response timing adjustment from the identified target network node in response to the unique handoff ranging code; and
synchronizing with the identified target network node based on the ranging response timing adjustment.

5. The method of claim 4 further comprising:
transmitting the unique handoff ranging code to the target network node in response to the ranging response timing adjustment; and
receiving a ranging response from the target network node in response to the unique handoff ranging code.

6. The method of claim 1, wherein the unique handoff ranging code is derived from the handover ID and a base ranging code.

7. The method of claim 1, wherein the wireless communication network comprises at least one of an Orthogonal Frequency Division Multiple Access (OFDMA) network or an Orthogonal Frequency Division Multiplexing (OFDM) network.

8. A method for optimizing network entry during handoffs in a wireless communication network comprising:
broadcasting target ranging codes to a plurality of remote units associated with a serving network node, wherein each of the target ranging codes identifies one of a plurality of target network nodes;
receiving a handoff request from at least one of the plurality of remote units, wherein the handoff request indicates a target ranging code of the broadcasted target ranging codes identifying at least one of the plurality of target network nodes as a handoff candidate for the at least one of the plurality of remote units; and
transmitting a handoff request response to at least one of the plurality of remote units, wherein the handoff request response includes a unique handoff ranging code, further wherein the unique handoff ranging code is different from the target ranging code, further, wherein the unique handoff ranging code is derived from a handover ID corresponding to the handoff request, and wherein the unique handoff ranging code uniquely identifies a one of the plurality of remote units.

9. The method of claim 8, wherein the handoff request response includes a dedicated ranging region information.

10. The method of claim 8 further comprising:
transmitting a handoff notification to the identified target network node in response to the received handoff request; and
receiving a handoff notification response from the identified target network node in response to the handoff notification, wherein the handoff notification response includes the unique handoff ranging code for the at least one of the plurality of remote units.

11. The method of claim 10 further comprising:
receiving a handoff indication from the at least one of the plurality of remote units in response to the handoff request response; and
transmitting a handoff confirm to the identified target network node in response to the handoff indication.

12. The method of claim 8, wherein the unique handoff ranging code is derived from the handover ID and a base ranging code.

13. The method of claim 8, wherein the wireless communication network comprises at least one of an Orthogonal Frequency Division Multiple Access (OFDMA) network or an Orthogonal Frequency Division Multiplexing (OFDM) network.

14. A network node comprises:
a transceiver;
a network interface; and
a processing unit, coupled to the transceiver and the network interface, wherein the processing unit being, adapted to
broadcast target ranging codes to a plurality of remote units associated with the serving network node, wherein each of the target ranging codes identifies one of a plurality of target network nodes;
receive a handoff request from at least one of the plurality of remote units, wherein the handoff request indicates a target ranging code of the broadcasted target ranging codes identifying at least one of the plurality of target network nodes as a handoff candidate for the at least one of the plurality of remote units; and
transmit a handoff request response to at least one of the plurality of remote units, wherein the handoff request response includes a unique handoff ranging code, wherein the unique handoff ranging code is different from the target ranging codes, further, wherein the unique handoff ranging code is derived from a handover ID corresponding to the handoff request and wherein the unique handoff ranging code uniquely identifies one of the plurality of remote units.

15. The network node of claim 14, wherein the handoff request response includes a dedicated ranging region information.

16. The network node of claim 14, wherein the processing unit being further adapted to:
transmit a handoff notification to the identified target network node in response to the received handoff request; and
receive a handoff notification response from the identified target network node in response to the handoff notification, wherein the handoff notification response includes the unique handoff ranging code for the at least one of the plurality of remote units.

17. The network node of claim 16, wherein the processing unit being further adapted to:
receive a handoff indication from the at least one of the plurality of remote units in response to the handoff request response; and
transmit a handoff confirm to the identified target network node in response to the handoff indication.

18. The network node of claim 14, wherein the unique handoff ranging code is derived from the handover ID and a base ranging code.

* * * * *